Sept. 20, 1955 F. W. B. PORTER 2,718,490
CATALYTIC DESULPHURISATION OF PETROLEUM HYDROCARBONS
Filed May 13, 1953
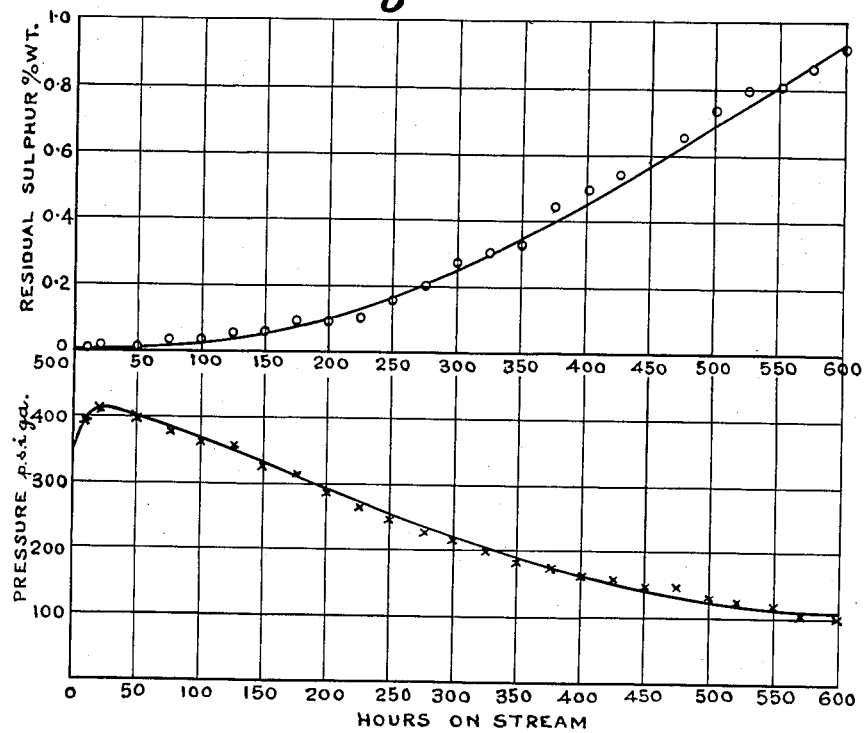
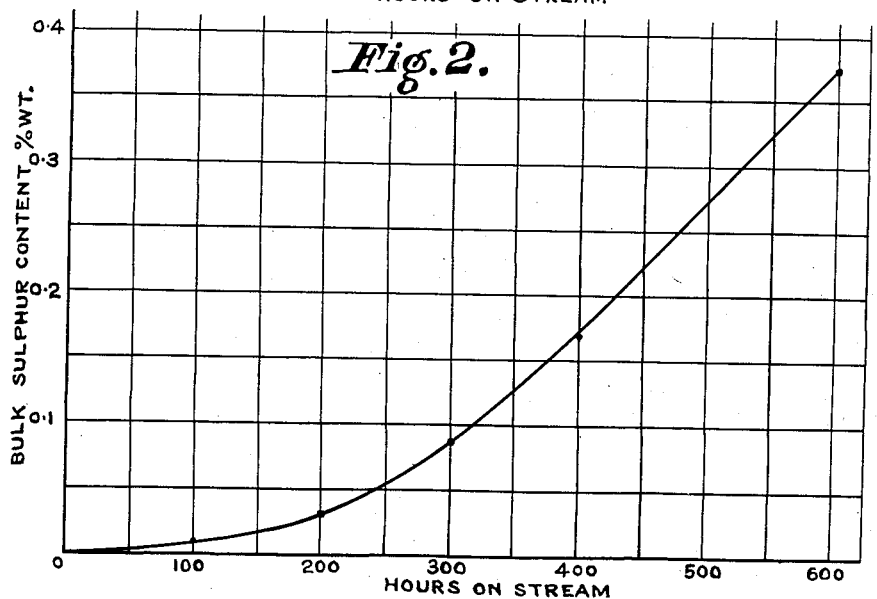
INVENTOR
FREDERICK WILLIAM BERTRAM PORTER
By *Morgan, Finnegan, Durham & Pine*
Attorneys

United States Patent Office 2,718,490
Patented Sept. 20, 1955

2,718,490
CATALYTIC DESULPHURISATION OF PETROLEUM HYDROCARBONS

Frederick William Bertram Porter, Sunbury-on-Thames, England, assignor to The British Petroleum Company Limited Application May 13, 1953, Serial No. 354,764

Claims priority, application Great Britain May 21, 1952

2 Claims. (Cl. 196—28)

This invention relates to the catalytic desulphurisation of petroleum hydrocarbons and more particularly to the autofining of gas oils.

The autofining of gas oils has been described in British patent specification No.669,553 and its companion U. S. Patent No. 2,574,448 but as indicated therein, the extent of desulphurisation falls off fairly rapidly with hours on stream so that frequent regeneration of the catalyst is necessary to maintain a satisfactory degree of desulphurisation, which is an obvious disadvantage in the practical application of the process.

In the autofining process as described in U. S. Patents Nos. 2,573,726 and 2,574,445-2,574,451 inclusive, the catalyst and the conditions are chosen so that sufficient hydrogen for desulfurization is produced by dehydrogenation of naphthenic hydrocarbons present in the feedstock to aromatic hydrocarbons, without the necessity of supplying hydrogen from an extraneous source and without deleterious side reactions taking place. The type of autofining wherein the operation is carried out so as to allow all the hydrogen produced to remain in the system is known as equilibrium pressure operation and is the subject of U. S. Patent No. 2,648,623.

The principal object of the present invention is to enable the process to operate with a satisfactory degree of desulphurisation for considerably longer periods between regenerations than has been possible hitherto.

According to the invention, a process for the autofining of gas oil comprises passing the gas oil at a space velocity of less than 1 v./v./hr. to a reaction zone wherein it is contacted with a catalyst consisting of or comprising the oxides of cobalt and molybdenum deposited on or incorporated with a support, preferably alumina, said catalyst also containing a small amount of fluorine, at a temperature within the range 750–800° F., separating a hydrogen-rich gas from the products from the reaction zone and recycling the whole of said hydrogen-rich gas to the reaction zone.

The preparation of a catalyst consisting of or comprising the supported oxides of cobalt and molybdenum, and also containing fluorine, is described in the specification of the copending British patent application No. 22,844/51 dated October 1, 1951, and in its companion copending U. S. application Serial No. 311,429, filed September 25, 1952.

The improved results to be obtained by the process according to the present invention are illustrated in the following examples.

Example I

A Kuwait gas oil of Sp. Gr. 0.8505, distillation ASTM, 224.5–386° F., and a sulphur content of 1.43% weight was passed over a fluorine-containing catalyst comprising the oxides of cobalt and molybdenum deposited on alumina, at a temperature of 780° F. and an initial pressure of 150 p. s. i. ga. A hydrogen-rich gas was continuously separated from the treated gas oil and recycled to the reaction zone. The catalyst contained the following ingredients calculated on material stable at 1050° F.

| | Percent weight |
|---|---|
| $MoO_3$ | 17.25 |
| $CoO$ | 4.26 |
| F | 2.3 |

The gas oil was first passed over the catalyst at a space velocity of 1.0 v./v./hr. and after only 40 hours on stream, the pressure had fallen from a maximum of just over 300 p. s. i. ga. to 275 p. s. i. ga. and the residual sulphur had risen to 0.075% weight and was increasing rapidly.

The gas oil was then passed over the catalyst at a space velocity of 0.5 v./v./hr. and after nearly 200 hours on stream, the pressure was still above 275 p. s. i. ga. after having reached a maximum of nearly 350 p. s. i. ga. and was declining more slowly than in the previous run, while the residual sulphur was still only just 0.075% weight and was rising more slowly than in the previous run.

Throughout the runs at 1.0 and 0.5 v./v./hr. the gas recycle rate varied in accordance with the pressure between 5000 and 12,000 SCF/B.

It will be understood that the space velocity as referred to above is calculated in volumes of liquid feedstock per volume of catalyst per hour.

Example II

The same gas oil as in Example I was passed at a space velocity of 0.5 v./v./hr. over the same catalyst at a temperature of 780° F. and an initial pressure of 350 p. s. i. ga. A hydrogen-rich gas was continuously separated from the treated gas oil and recycled to the reaction zone at a rate varying between 12,000 and 3000 SCF/B. The run was continued for 600 hours, the sulphur content of the total product collected over this period being 0.37% wt. compared with 0.3% wt. over only 200 hours when operating at 1.0 v./v./hr.

The results obtained during this run are illustrated in the accompanying drawings, wherein:

Figure 1 shows the variation of residual sulphur and pressure with hours on stream, and Figure 2 shows the variation of "bulked" sulphur with hours on stream. The "bulked" sulphur over a particular period is the sulphur content of the total product collected over that period.

I claim:

1. In a process for the autofining of gas oil, the improvement comprising passing the gas oil at a space velocity not in excess of about 0.5 v./v./hr. of the liquid gas oil to a reaction zone wherein it is contacted with a catalyst of cobalt and molybdenum oxide on a support, said catalyst containing a minor amount of fluorine, at a temperature within the range of about 750–800° F., separating the products from the reaction zone into a gas oil having a reduced sulphur content and a hydrogen-rich gas, and recycling the whole of said hydrogen-rich gas to the reaction zone, the hydrogen of said gas constituting the whole of the hydrogen supplied as such to said zone.

2. A process according to claim 1 wherein the support of the catalyst is an aluminous support.

References Cited in the file of this patent
UNITED STATES PATENTS

| 2,500,146 | Fleck et al. | Mar. 14, 1950 |
| 2,573,149 | Kassel | Oct. 30, 1951 |
| 2,574,448 | Docksey et al. | Nov. 6, 1951 |
| 2,658,028 | Haensel et al. | Nov. 3, 1953 |